Oct. 13, 1953     F. N. WILLMS     2,655,300
PIPE HANDLE ADAPTER
Filed April 6, 1951
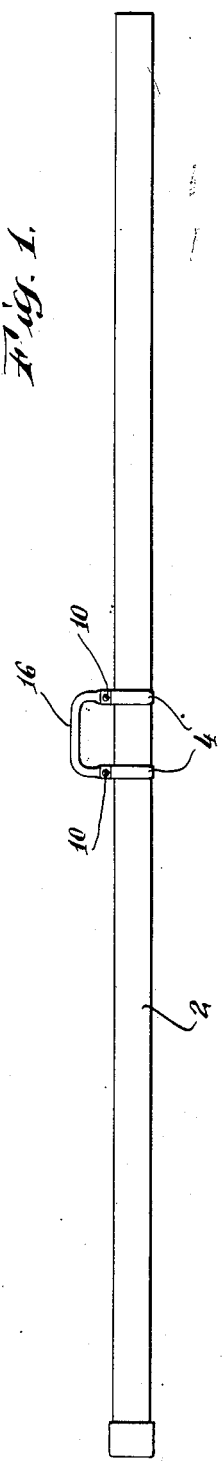
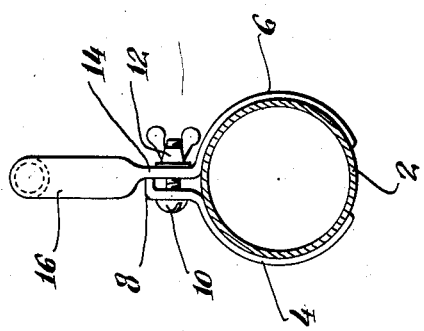
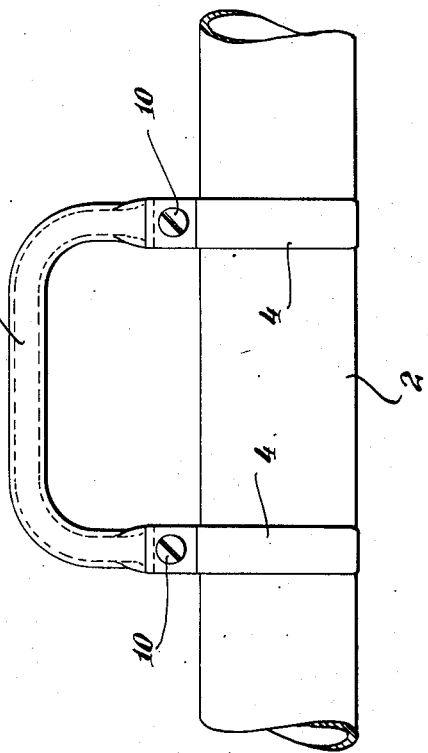
INVENTOR.
Fritz N. Willms
BY
ATTORNEY Patented Oct. 13, 1953

2,655,300

UNITED STATES PATENT OFFICE 2,655,300

PIPE HANDLE ADAPTER

Fritz N. Willms, Tonasket, Wash.

Application April 6, 1951, Serial No. 219,679

1 Claim. (Cl. 224—45)

The present invention relates to new and useful improvements in devices for the handling of pipe, such as the portable aluminum irrigation pipe used in sprinkler systems for the irrigation of agricultural projects.

For irrigating land by means of sprinklers usually there is being used one sprinkler for each acre of land, and each sprinkler has to be moved from one place to another at least twice a day in the case of heavy soil, and at least three times a day in the case of light soil. To use more sprinklers per acre, and thus to save some of the work of moving the sprinklers is prohibitive due to the high cost of the sprinklers. Together with the sprinklers there have to be moved each time the irrigation pipe sections which are twenty to forty feet long and two to four inches in diameter. Hitherto the moving of the pipes for sprinkler irrigation of approximately thirty acres required about two men, who had to work as long as the sprinklers were in operation.

One object of the present invention is the provision of a device of the character described which will greatly reduce the manpower required for moving of irrigation pipes, and which thus will reduce the cost of sprinkler irrigation, by providing a detachable, convenient handle for each length of pipe to be attached to the center portion of each pipe, so that each man can carry easily one or two pipes in each hand.

Another object of the present invention is the provision of a device of the character described which protrudes upwardly beyond the pipe wall to such a height that a man does not have to bend down so far as would be necessary if he had to grasp the pipe directly, thus facilitating the picking up of pipes and suiting the particular leverage needed to make it easier to balance lengthy irrigation pipes.

A further object of the present invention is the provision of a device of the character described which is easily and quickly attachable to and detachable from pipes without the use of any tools and without the application of any considerable amount of skill.

Yet still another object of the present invention is the provision of a device of the character described which is light in weight and simple in construction, so that it can be manufactured and sold at a very reasonable price, but which also is sturdy, durable, and well adapted for the rough usage to which devices of this type usually are subjected.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing a preferred form of the invention has been shown.

In said drawing:

Figure 1 is a side view of a preferred embodiment of my invention attached to a length of pipe;

Figure 2 is an enlarged side view of the same on a fractional piece of pipe; and, Figure 3 is an enlarged end view.

Similar reference characters refer to similar parts throughout the several views.

In the drawing the numeral 2 denotes a pipe sections in the center of which are encompassed partially by a pair of pipe clips 4 and a pair of substantially semi-circular end sections 6 of flange portions of a handle which is shaped as an inverted U.

Each pipe clip 4 has a rectangular end portion 8 one section of which is vertical while the other section is horizontal, as may be seen in Figure 3. A threaded bolt 10 is extended through each vertical section of each end portion 8, and a wing nut 12, or any other suitable type of nut, is screwed upon the end of each bolt 10. A vertical, flattened section 14, through which extends a bolt 10, is intermediate each semi-circular section 6 and that section of each flange portion of the handle 16 which is adjacent the horizontal web portion of each handle 16. Said web portion preferably is circular in cross-section for gripping convenience, and the horizontal sections of the portions 8 of the clips 4 rest against the sections 14 of the handle 16 if the nuts 12 are tightened. Thus the handle 16 can be secured to a pipe 2 simply and quickly by laying therearound the clips 4 and the sections 6 and tightening the nuts 12; and the handle 16 can be detached from a pipe 2 by loosening the nuts 12.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which as a matter of language might be said to fall therebetween.

Having thus fully described my said invention, what I claim as new and desire to secure by Letters Patent in the United States is:

A pipe handle adaptor comprising a U-shaped handle member having a web portion and a pair of flange portions each of which has adjacent the web portion a first section which is circular in cross-section and terminates at a second section which is flat and straight and laterally disposed relative to the longitudinal axis of the first section, and a third section formed as a substantially semi-circular continuation of the second section; a pair of pipe clips each of which has a substantially semi-circular main portion located opposite the third section of one of said web portions, from which extends at one end a straight intermediate portion parallel to the second section of the web portion, and an end portion right angularly disposed to said intermediate portion and extending from the outer end thereof toward said second section; a pair of threaded bolts each of which has a head portion and a shaft portion extending through the intermediate portion of one of said pipe clips as well as through the second section of one of said web portions; and a wing nut screwed upon the outer shaft portion of each bolt; the third sections of said web portions and the main portions of said pipe clips being adapted for partially encompassing sections of a pipe, and said bolts and nuts being adapted for tightening said pipe clips and the third sections of said web portions about the pipe, thereby the end portions of said pipe clips keeping the intermediate portions thereof in spaced relation to the second sections of said web portions.

FRITZ N. WILLMS.

References Cited in the file of this patent

UNITED STATES PATENTS

| Number | Name | Date |
|---|---|---|
| 622,246 | Matheas | Apr. 4, 1899 |
| 633,899 | Peacock | Sept. 26, 1899 |
| 958,052 | Williams | May 17, 1910 |

FOREIGN PATENTS

| Number | Country | Date |
|---|---|---|
| 135,100 | Great Britain | Nov. 20, 1919 |